United States Patent [19]

Tsumura et al.

[11] Patent Number: 5,261,717
[45] Date of Patent: Nov. 16, 1993

[54] SUN VISOR APPARATUS FOR VEHICLES

[76] Inventors: Toshihiro Tsumura, 7-21, Abiko 3-chome, Sumiyoshi-ku, Osaka; Nobuo Komatsu, 22-13-102, Kouenminamiyata 4-chome, Higashisumiyoshi-ku, Osaka, 546, both of Japan

[21] Appl. No.: 919,414

[22] Filed: Jul. 27, 1992

[30] Foreign Application Priority Data

Jul. 27, 1991 [JP] Japan ................. 3-066480[U]

[51] Int. Cl.⁵ ................................. B60J 3/02
[52] U.S. Cl. ................... 296/97.2; 296/97.4; 296/97.8
[58] Field of Search ............ 296/97.8, 97.4, 97.2

[56] References Cited

U.S. PATENT DOCUMENTS

| | | | |
|---|---|---|---|
| 2,607,906 | 8/1952 | Sang | 296/97.4 |
| 3,226,151 | 12/1965 | Reuther | 296/97.4 |
| 4,874,195 | 10/1989 | Lu et al. | 296/97.2 |
| 4,974,897 | 12/1990 | Shirley | 296/97.8 |
| 5,015,027 | 5/1991 | Rifaat | 296/97.6 |

*Primary Examiner*—Robert R. Song
*Attorney, Agent, or Firm*—Lowe, Price, LeBlanc & Becker

[57] ABSTRACT

An apparatus for preventing the driver of a vehicle from being blinded by the glare of light by selectively moving a light-shielding plate in two-dimensions along an inside surface of the windshield to provide a light-shielding region. The light-shielding plate is controllably moved by hand or by motor. More preferably, the apparatus further includes a microcomputer for obtaining the crossing point between light coming into the eye of the driver and the windshield plate, and a mechanism or circuit for moving the light-shielding plate to a shielding position defined by the microcomputer.

12 Claims, 9 Drawing Sheets

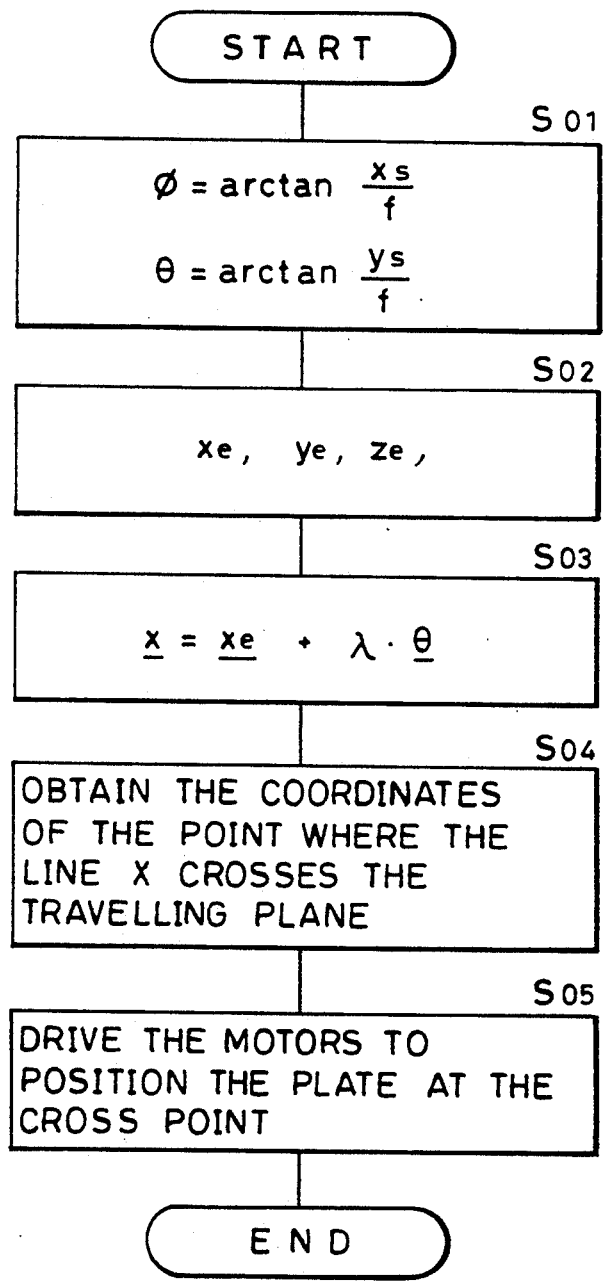

SUN VISOR APPARATUS FOR VEHICLES

BACKGROUND OF THE INVENTION

1. Field of the Invention

The present invention relates to an apparatus for preventing the glare of light such as sunlight coming into a vehicle through the windshield.

2. Description of the Related Art

In conventional cases where the glare of sunlight such as the sunset or sunrise entering through a windshield 50 prevented the driver of a vehicle from having a clear front range of vision, the sun 52 within the view was blocked by a light-shielding plate 54, swingable in the direction shown in arrow 58 in FIG. 1.

The conventional sun visor apparatus shown in FIG. 1 had the following problem. Suppose that a signal 56 or a signpost is seen to be located near the sun 52. The driver will not be able to see the signal 56 or the signpost because they are hidden by the light-shielding plate 54. A conventional light-shielding plate 54 is inconvenient, and may sometimes induce dangerous situations.

SUMMARY OF THE INVENTION

From the foregoing, an object of the present invention is to provide a sun visor apparatus for a vehicle to facilitate the safety driving of a vehicle.

The sun visor apparatus for a vehicle according to the present invention includes a longitudinal main polarizing plate and a sub-polarizing plate respectively having a direction of polarization substantially perpendicular to each other. The main polarizing plate is provided movable in a horizontal direction along the windshield. The sub-polarizing plate is overlaid on the main polarizing plate to be movable in the vertical direction.

The sun visor apparatus for a vehicle according to another aspect of the present invention includes a lateral main polarizing plate and a sub-polarizing plate each having a direction of polarization at right angles. The main polarizing plate is provided in association with the windshield and movable in the vertical direction. The sub-polarizing plate is overlaid on the main polarizing plate to be movable in a horizontal direction along the windshield.

In the above-described sun visor apparatus for a vehicle, the transmittance of light is minimum and hardly passes light in the overlapping section of the main polarizing plate and the sub-polarizing plate. The overlapping section can be moved in two dimensions to a desired position.

The glare of light can be prevented as a result of light being blocked at the overlapping section. The main polarizing plate except for the overlapping section has a high light transmittance. Therefore, a signal or a signpost can be perceived with almost no blocking of the range of vision even if the signal or signpost is located near the direction of the light source.

A sun visor apparatus for a vehicle according to a further aspect of the present invention includes a light-shielding plate and a two-dimensional moving mechanism for moving the light-shielding plate to an arbitrary position along the plane of the windshield.

The light-shielding plate can easily be moved to a desired position along the plane of the windshield. Therefore, light can be blocked with the light-shielding plate regardless of the direction of light.

A sun visor apparatus for a vehicle according to an additional aspect of the present invention includes a light-shielding plate, a swingable and extensible arm having one end attached to the light-shielding plate, an arm extending mechanism for drawing out the arm, and a swingable mechanism for swinging the arm along the windshield.

The light-shielding plate can be motor-driven to an arbitrary position along the plane of the windshield by the arm extending mechanism and the swingable mechanism. Therefore, the glare of light can easily be prevented regardless of the direction of light.

According to another aspect of the present invention, an apparatus for preventing the driver of a vehicle from being blinded by light includes a crossing position detection circuit for detecting the crossing position of light reaching the eye of the driver and a predetermined plane, and a light-shielding mechanism responsive to the output of the crossing position detection circuit for reducing the intensity of sunlight passing through a predetermined range including the crossing position of the predetermined plane.

Upon obtaining the crossing position of light and the predetermined plane, the intensity of light is reduced within a predetermined range including the crossing position as a target. The intensity of light entering the eye of the driver can be automatically reduced without having to move the light shielding plate directly by the hand of the driver or electrically by manually operating a switch. The glare of light can be prevented from entering the eye of the driver without disturbing the attention of the driver. Therefore, an apparatus can be provided that realizes safety driving.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a flow chart of the program executed in the main CPU of the sun visor apparatus of FIG. 13.

DESCRIPTION OF THE PREFERRED EMBODIMENTS

The present invention will be described in detail with reference to the drawings showing the embodiments.

Although sunlight is taken as an example in the description, the present invention is applicable to other glaring light such as the head light of a vehicle, sunlight reflected from glass or metal, and light reflected from a wet surface on the road.

Figure 1:
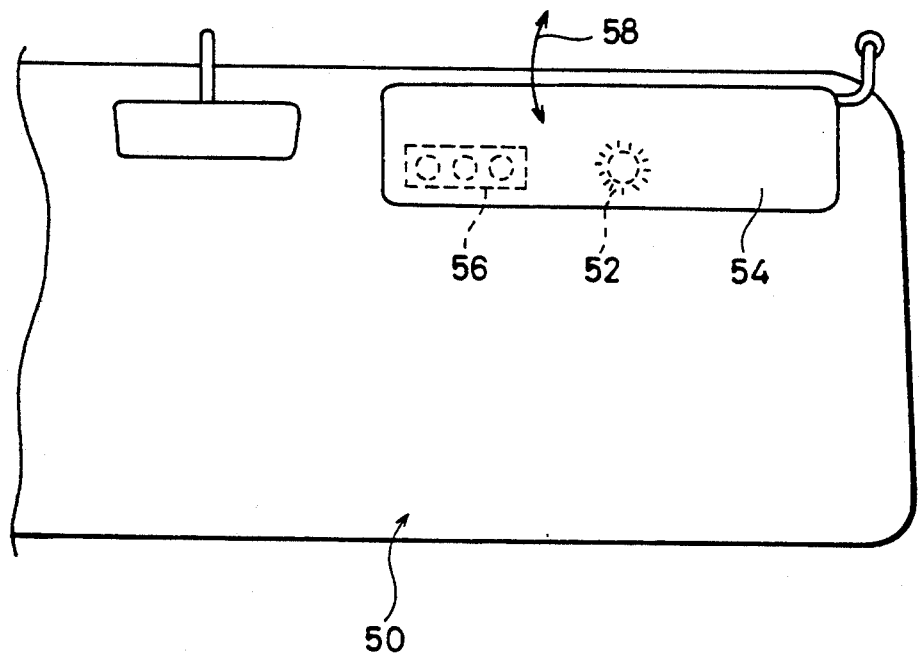
FIG. 1 is a front view of a conventional sun visor apparatus for a vehicle.
Figure 2:
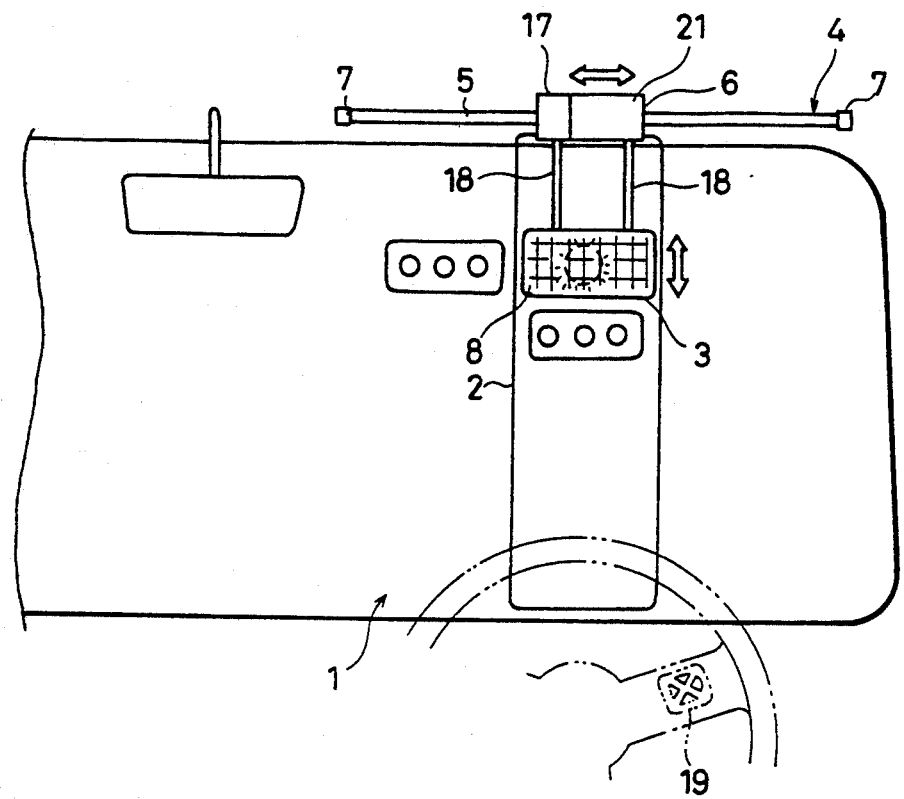
FIG. 2 is a front view of a sun visor apparatus according to an embodiment of the present invention.

FIG. 2 shows a sun visor apparatus for a vehicle according to the present invention. Referring to FIG. 2, the apparatus includes a main polarizing plate 2 and a sub-polarizing plate 3 provided at the left side, right side, or at both sides of a windshield 1 of an automobile, a train, a vessel, an aircraft, or a vehicle for civil engineering and agricultural work such as a tractor, and a moving mechanism 4 for movably supporting polarizing plates 2 and 3.

Polarizing plates 2 and 3 are respectively formed of a polarizing glass or film of substantially a rectangular shape. The main polarizing plate 2 is longitudinal in shape. The sub-polarizing plate is smaller than the main polarizing plate 2 had is lateral in shape. The main polarizing plate 2 preferably has a bow-shaped cross section for the purpose of reducing deflection.

The polarizing plates 2 and 3 are arranged so that the direction of polarization is substantially perpendicular to each other when combined as shown in FIG. 2. For example, one has a direction of polarization in the vertical direction, and the other has a direction of polarization in the horizontal direction. Alternatively, one of the polarizing plates 2 and 3 may have a direction of polarization inclining upwards towards the left, and the other a direction of polarization inclining downwards towards the left.

The moving mechanism 4 is attached to the wall above the upper edge of the windshield position by means of a fixture 7. The moving mechanism 4 includes a rail 5 with fixtures 7 at both ends, and a winding apparatus 6 slidably attached to rail 5 to be anchored at an arbitrary position for moving the sub-polarizing plate 3 in the vertical direction.

The rail 5 and the winding apparatus 6 are formed such that the winding apparatus 6 is slidable and not rotatable with respect to the rail 5. The winding apparatus 6 and the rail 5 are implemented so that the winding apparatus 6 does not move in spite of the vibration of the vehicle to which the sun visor apparatus is installed, or external source such as gravity exerted at the time of changing the direction of vehicle.

More specifically, the rail 5 includes a rod having a polygon cross section. The winding apparatus is fitted to the rail 5 so as not to be detached. A leaf spring or the like is provided in the winding apparatus 6 to urge the rail 5 for anchoring the winding apparatus 6. Alternatively, the winding apparatus 6 may be fitted into a groove provided in the rail 5 and fixed with a screw.

The winding apparatus 6 includes a cover 21, a motor 17 accommodated in the cover 21, a reel not shown coupled to the motor 17, a strip-like flexible guide member 18 wound around the reel, a power source (not shown) for driving the motor 17, and an operation switch 19 provided at the steering wheel or the like.

The motor 17 is switch-drivable in an arbitrary direction of rotation in response to the operation of the operation switch 19. The sub-polarizing plate 3 is attached to the end of the guide member 18 such that the direction of polarization of the sub-polarizing plate 3 is substantially perpendicular to that of the main polarization plate 2. The guide member 18 is wound/unwound in response to the rotation of the motor 17 around a reel not shown attached to the motor 17. By operating the operation switch 19, the sub-polarizing plate 3 moves in a vertical direction on the main polarizing plate 2. This means that the overlapping section 8 of the main polarizing plate and the sub-polarizing plate moves in a vertical direction. The guide member 18 may be a fine rod. The sub-polarizing plate 3 can be moved in the vertical direction by moving this rod upwards/downwards.

The polarizing plates 2 and 3 are superimposed so that the directions of polarization thereof are substantially perpendicular to each other. The main polarizing plate 2 is fixed to the cover 21 of the winding apparatus 6, and the sub-polarizing plates 3 is fixed to the end of the guide member 18. In the case of polarizing plates 2 and 3 having the configurations shown in FIG. 2, the direction of polarization, i.e. the plane of polarization of polarizing plates 2 and 3 may be set in parallel with the respective longitudinal sides of polarizing plates 2 and 3.

The winding apparatus 6 and the main polarizing plate 2 are movable manually in a horizontal direction along rail 5. The sub-polarizing plate 3 is motor-driven vertically in response to the operation of the operation switch 19.

With the sun visor apparatus for a vehicle shown in FIG. 2, sunlight is substantially blocked at the overlapping section of the polarizing plates 2 and 3 having orthogonal directions of polarization. Light is easily transmitted in the remaining area.

When it becomes hard to observe the front view as a result of the glare of sunlight during driving, the glare of the sunlight can be prevented as follows. The main polarizing plate 2 is manually moved in the horizontal direction. Then, the sub-polarizing plate 3 is moved vertically by the operation switch 19 so that the overlapping section 8 is positioned to intercept the light on the route between the sun and the eye of the driver.

Because the transmittance of light in the main polarizing plate 2 except for the overlapping section 8 is high, the view will not be blocked when there is a signal or a signpost near the direction of the sun. The signal or the signpost can be reliably identified to allow safety driving.

The planes of polarization of the polarizing plates 2 and 3 may be respectively perpendicular to the longitudinal side instead of being parallel to the longitudinal side. Alternatively, they may be 45° rightwards or leftwards with respect to the longitudinal side. This gives an advantage that the view will not be disturbed by the interference between the polarizing plates 2 or 3 and the polarizing glass of sunglasses in the case the driver wears sunglasses with polarizing glass having a plane of polarization in the vertical or horizontal direction.

Figure 3:
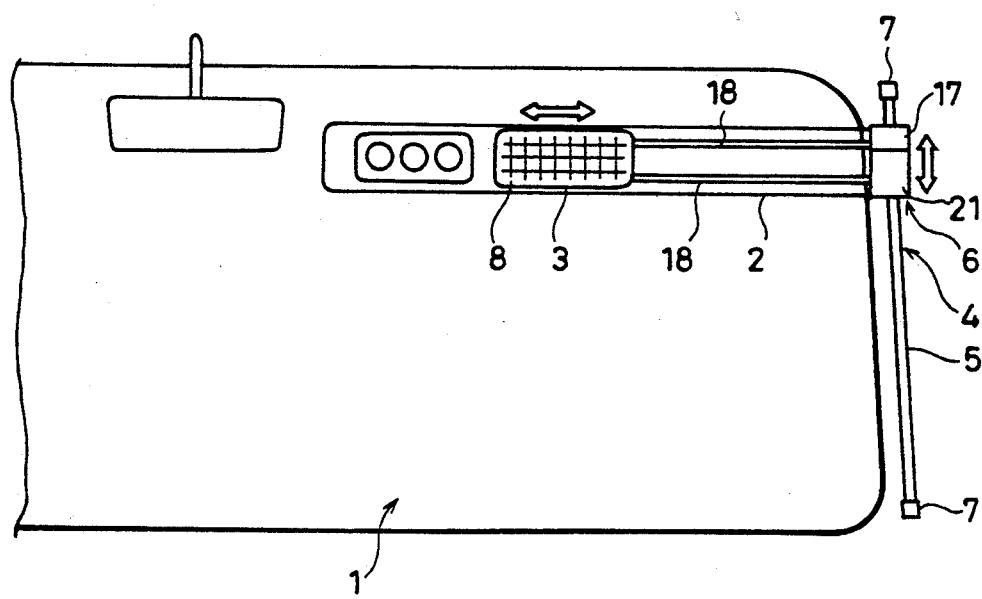
FIG. 3 is a front view of a sun visor apparatus according to a second embodiment of the present invention.

FIG. 3 is a sun visor apparatus for a vehicle according to a second embodiment of the present invention. Referring to FIG. 2, the apparatus includes a main polarizing plate 2 and a sub-polarizing plate 3 having a direction of polarization at right angles. The lateral main polarizing plate 2 is movable vertically along the windshield 1. The sub-polarizing plate 3 overlaid on the main polarizing plate 2 is provided in a horizontally movable manner with respect to the main polarizing plate 2.

More specifically, the moving mechanism 4 of the first embodiment shown in FIG. 2 is fixed to the wall at the right side end of the windshield position by means of a fixture 7, as shown in FIG. 3. The main polarizing plate 2 and the sub-polarizing plate 3 are overlaid so that the direction of polarization are substantially perpendicular to each other. The main polarizing plate 2 is attached to the cover 21 of the winding apparatus 6. The sub-polarizing plate 3 is attached to the end of the guide member 18.

Such an arrangement allows a vertical travel of the main polarizing plate 2 by hand. The sub-polarizing plate 3 is movable horizontally by a motor. The present invention is not limited to the position of the sun visor apparatus at the right side of the windshield, as shown in FIG. 3. The sun visor apparatus may be provided at the left side of the windshield, or may be provided at both sides.

Figure 4:
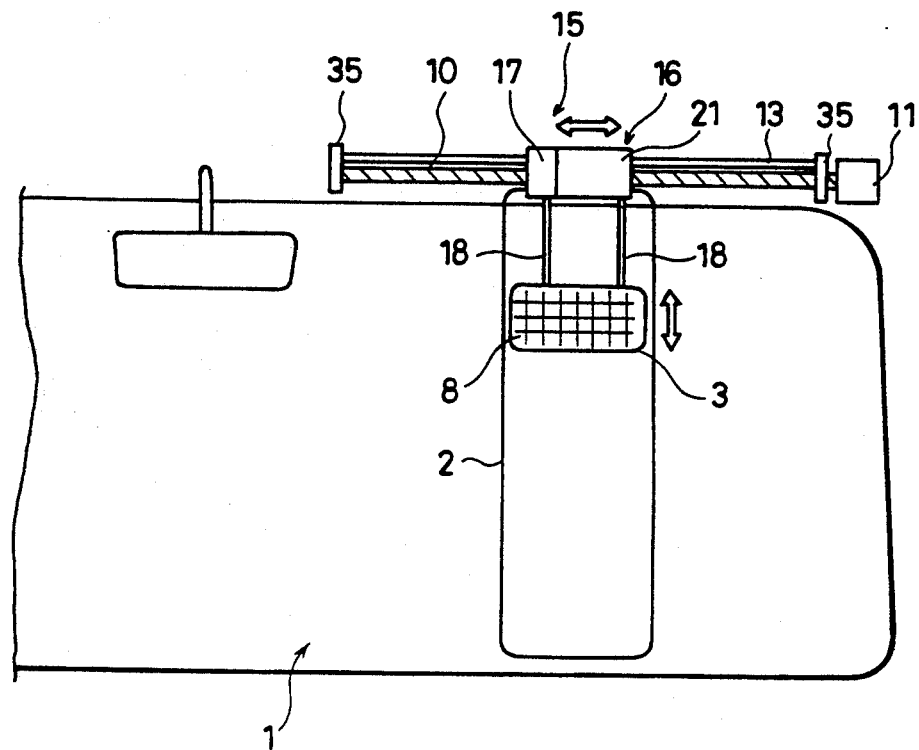
FIG. 4 is a front view of a sun visor apparatus according to a third embodiment of the present invention.

FIG. 4 is a front view of the sun visor apparatus for a vehicle according to a third embodiment of the present invention. Referring to FIG. 4, the third embodiment is characterized in that the main polarizing plate 2 of the first embodiment shown in FIG. 2 is moved not manually, but by a motor-driven moving mechanism 15.

More specifically, the motor-driven moving mechanism 15 includes a rotatably provided screw shaft 10, a motor 11 coupled to the screw shaft 10 for rotating the screw shaft 10, a winding apparatus 16 having a tapped through-hole engaging with the screw shaft 10, a rail 13 slidably inserted into the winding apparatus 16 for suppressing the rotation of the winding apparatus 16, a source not shown for driving motors 11 and 17, and operation switch not shown. An operation switch similar to the operation switch 19 shown in FIG. 2 can be used.

The screw shaft 10 and rail 13 are fixed above the upper end of the windshield 1 by means of an attaching member 35. The winding apparatus 16 is attached to the screw shaft 10 and the rail 13 to move horizontally according to the rotation of the screw shaft 10.

The motor 11 can be switched to rotate in an arbitrary direction. The motor 11 and the motor 17 of the winding apparatus 16 can be operated by the operation switch.

The main polarizing plate 2 is fixed to the cover 21 of the winding apparatus 16. The sub-polarizing plate 3 is fixed to the guide member 18 of the winding apparatus 16. The main polarizing plate 2 moves horizontally by the motor 11. The sub-polarizing plate 3 moves vertically by the motor 17.

The main polarizing plate 2 of the second embodiment of FIG. 3 can be made to move vertically with the motor-driven moving mechanism 15 shown in FIG. 4. The sun visor apparatus shown in FIGS. 3 and 4 may be provided at the left side, or at both sides of the windshield position of the vehicle.

Figure 5:
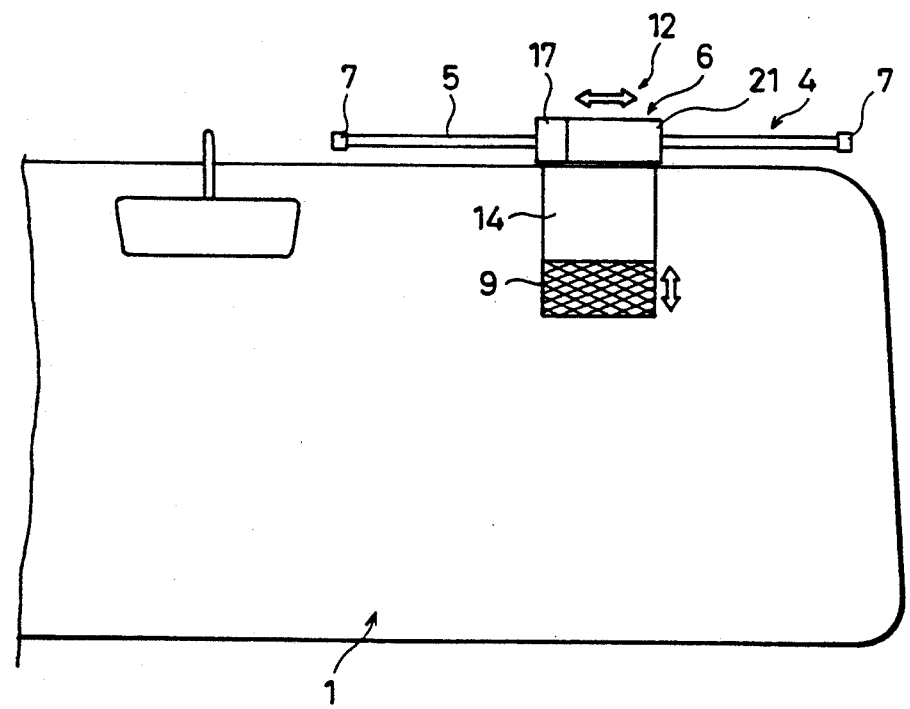
FIG. 5 is a front view of a sun visor apparatus according to a fourth embodiment of the present invention.

FIG. 5 shows a sun visor apparatus according to a fourth embodiment of the present invention. The sun visor apparatus of FIG. 5 includes a small light-shielding plate 9 of a very low transmittance, and a two-dimensional moving apparatus 12 for moving the light-shielding plate 9 to an arbitrary position along the plane of the windshield position.

The two-dimensional moving mechanism 12 has a structure substantially similar to that of the moving mechanism 4 of the first embodiment shown in FIG. 2, provided that a transparent film 14 instead of the guide member 18 is wound/unwound electrically. The light-shielding plate 9 is attached to the end of the film 14. The winding apparatus 6 can be moved horizontally by hand along the rail 5. Therefore, the light-shielding plate 9 can be moved to an arbitrary position substantially in the right hand region of the windshield.

Although not illustrated, a guide member 18 having the light shield film 9 attached to its end may be used instead of the film 14 of FIG. 5. Similarly, the light-shielding plate 9 is movable to an arbitrary position in the right hand region of the windshield.

In the sun visor apparatus of FIG. 5, the two-dimensional moving mechanism 12 may be substituted by the motor-driven moving mechanism 15 shown in FIG. 4. The two-dimensional moving mechanism 12 may be provided at the left hand side, at both sides, at the left hand edge portion, the right hand edge portion, or at the edge portions of both sides.

Figure 6:
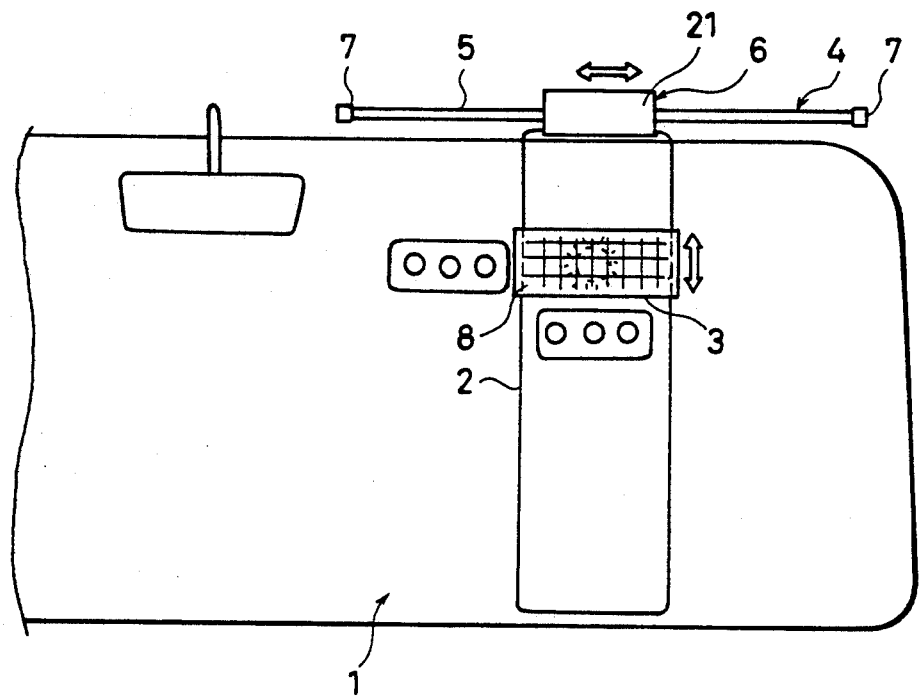
FIG. 6 is a front view of a sun visor apparatus according to a fifth embodiment of the present invention.
Figure 7:
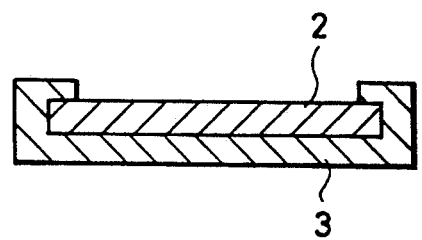
FIG. 7 is a sectional view of the sun visor apparatus of FIG. 6 with the main polarizing plate 2 and the sub-polarizing plate 3 engaged.

FIGS. 6 and 7 show the fifth embodiment of the present invention. The fifth embodiment differs from the first embodiment shown in FIG. 2 in that the sub-polarizing plate 3 is engaged to the main polarizing plate 2, as shown in FIG. 7, and that the motor 17 and the guide member 18 shown in FIG. 2 are not provided. According to the fifth embodiment, the sub-polarizing plate 3 is moved vertically manually. The main polarizing plate 3 and the sub-polarizing plate 2 both are moved by hand in a horizontal direction. Therefore, the overlapping section 8 of the polarizing plates 2 and 3 is movable by hand at an arbitrary position over substantially the right hand portion of the windshield.

Figure 8:
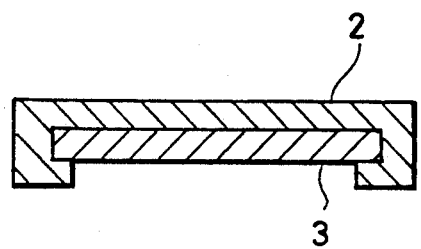
FIG. 8 is a sectional view of the sun visor apparatus showing another combination of the main polarizing plate 2 and the sub-polarizing plate 3.

In the fifth embodiment, the main polarizing plate 2 is engaged in a groove provided in the sub-polarizing plate 3, as shown in FIG. 7. The present invention is not limited to this configuration, and the sub-polarizing plate 3 may be engaged in a groove provided in the main polarizing plate 2, as shown in FIG. 8.

Figure 9:
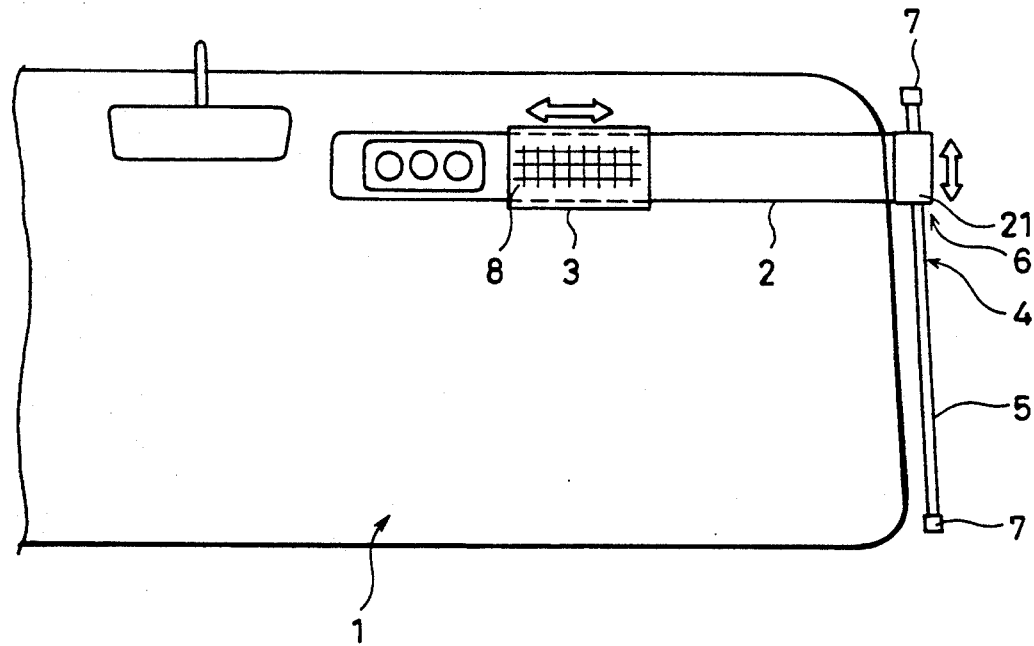
FIG. 9 is a front view of a sun visor apparatus according to a sixth embodiment of the present invention.

Furthermore, the sun visor apparatus may be manually moved horizontally and vertically as shown in FIG. 9 by the engagement of the sub-polarizing plate 3 and the main polarizing plate 2 of the second embodiment shown in FIG. 3. In this case, the motor 17 and the guide member 18 of FIG. 3 are not required as in the case of the fifth embodiment.

Figure 10:
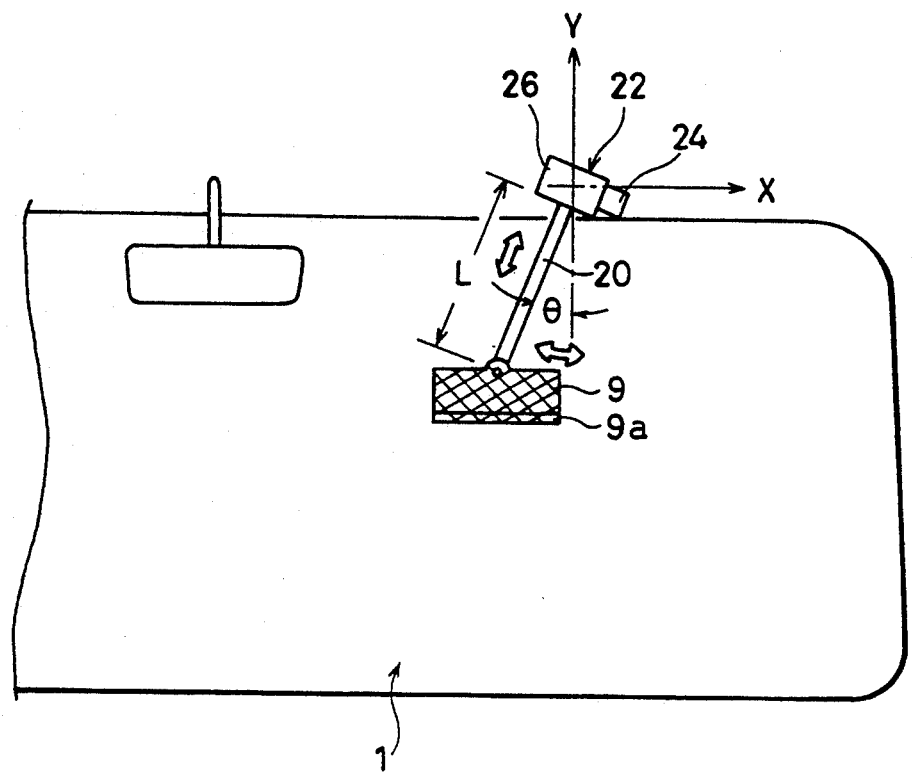
FIG. 10 is a front view of a sun visor apparatus according to a seventh embodiment of the present invention.
Figure 11:
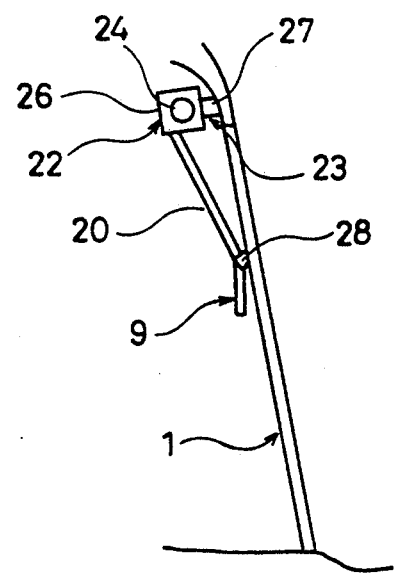
FIG. 11 is a side view schematically showing the sun visor apparatus of FIG. 10.

FIGS. 10 and 11 show a sun visor apparatus according to a seventh embodiment of the present invention. Referring to FIGS. 10 and 11, the sun visor apparatus includes a light-shield plate 9, an extensible arm 20 having the light-shield plate 9 attached to the end, an arm extending mechanism 22 for drawing out the arm 20, and a swingable mechanism 23 for swinging the arm 20 along the windshield 1. The light-shielding plate 9 can be moved to an arbitrary position within the right hand portion of the windshield 1 using the drum 20, the arm extending mechanism 22, and the swingable mechanism 23.

The arm 20 is formed of a steel plate having a bow-shaped cross section. The arm 20 can easily be drawn out as a steel-made tape, and is implemented so as not to easily deflect when drawn out.

The light-shielding plate 9 is rotatably attached to the end of the arm 20. A weight 9a is attached to the bottom end of the light-shielding plate 9. This serves to maintain the light-shielding plate 9 at an horizontal state even when the arm 20 swings.

Referring to FIG. 11, a roller 28 is attached to the end of the arm 20 which is in contact with the glass surface of the windshield 1. The roller 28 serves to reduce the friction between the light-shielding plate 9 and the windshield 1 in moving the light shielding plate 9.

The arm extending mechanism 22 includes a reel (not shown) for winding the arm 20, a motor 24 coupled to the reel for winding or unwinding the arm 20 around the reel, a power source not shown for driving the motor 24, and a controller (not shown) provided at the door or the like of a vehicle for controlling the motor 24. The reel is provided in a housing 26. The controller is preferably a controller with a knob such as one used for remote-controlling the side mirror of a vehicle.

The swingable mechanism 23 includes a motor 27 fixed at the insidewall above the windshield 1 for swinging the housing 26, a power source for driving motor 27 common to the motor 24, and a controller. The controller is common to that driving the motor 24. The motor 27 may be attached to the window frame of the windshield 1.

Figure 12:
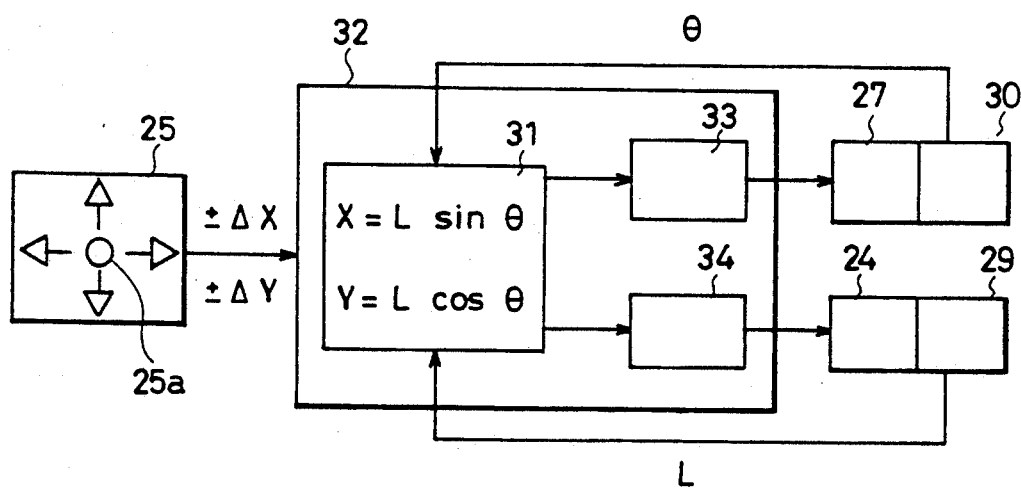
FIG. 12 is a block diagram showing the moving control circuit of the sun visor apparatus of the seventh embodiment of the present invention.

FIG. 12 is a block diagram of a circuit for controlling motors 24 and 27. Referring to FIG. 12, the motor 27 is provided with an angle sensor 30. The motor 24 is provided with an arm length sensor 29. The controller 25 has a knob 25a, as mentioned before.

The motors 27 and 24 can be switched to an arbitrary direction of rotation. These motors are operated in response to the operation of the controller 25 via a moving control unit 32 including an operation circuit 31 formed of a microcomputer and the like and control circuits 33 and 34. The arm 20 is wound or unwound about the reel by the operation of the motor 24. The housing 26 and the arm 20 can be made to swing about the motor axis of the motor 27 by the operation of the motor 27.

More specifically, the target position of the light-shielding plate 9 is calculated by the following equation. Referring to FIG. 10, the extending length of the arm 20 is L, and the angle between the standard axis (Y axis) and the arm 20 is 0. The position of the light shielding plate 9 is calculated by the following two equations.

$X = L \cdot \sin \theta$ $Y = L \cdot \cos \theta$

Referring to FIG. 12, data indicating ±X, ±Y are generated to be provided to the operation circuit 31 by moving horizontally and vertically the knob 25a of the controller 25. The operation circuit 31 automatically calculates the length L and the angle θ according to the above equations. The control circuits 33 and 34 respond to the output of the operation circuit 31 to drive motors 24 and 27, respectively. As a result, the arm 21 is extended/retracted to move the light-shielding plate 9 to an arbitrary position.

Sensors 29 and 30 detect the arm length L and the angle θ, respectively, to feed back the same to the operation circuit 31. By operating the knob 25a with such a control, the light-shielding plate can be moved vertically or horizontally.

In the case of utilizing a pulse motor for motors 24 and 27, the motors 24 and 27 are controlled by detection of a pulse signal without using the sensors 29 and 30 to move the light-shielding plate 9 to a desired position. The sun visor apparatus of this seventh embodiment can be provided at the left side, or at both sides of the windshield 1.

According to the seventh embodiment, the light-shielding plate 9 can be motor-driven to an arbitrary position along the plane of the windshield 1. As described above, the two motors 24 and 27 are provided at one location to result in a simple structure. Thus, a compact sun visor apparatus can be provided with the less possibility of the view being disturbed. The sun visor apparatus can be easily attached or exchanged with respect to the vehicle.

The present invention is not limited to the above-described embodiments, and various modifications are allowed. For example, the windshield 1 is not limited to the front window of a vehicle, and may be the rear window of a vehicle. In this case, only the glare of a powerful beam emitted from the rear from another vehicle at night can be prevented. There is no possibility of the entire rear range of vision getting dim as in the case where a conventional in-room mirror of low reflectance is used. The safety of the rear can easily be confirmed.

The angle of the plane of polarization of the polarizing plates 2 and 3 is not limited to approximately 90° as in the described embodiments. Any angle that can shield light to some extent is acceptable. However, it is empirically found out the light shielding section is preferably one that completely shields light. If the light is not completely blocked, the attention of the driver may be drawn to the movement of the light source. This is not desirable from the standpoint of safety. The winding apparatus 6 and 16 are not limited to motor-driven ones, and may be driven manually. The cross section of the polarizing plates 2 and 3 may be curved or linear.

Figure 13:
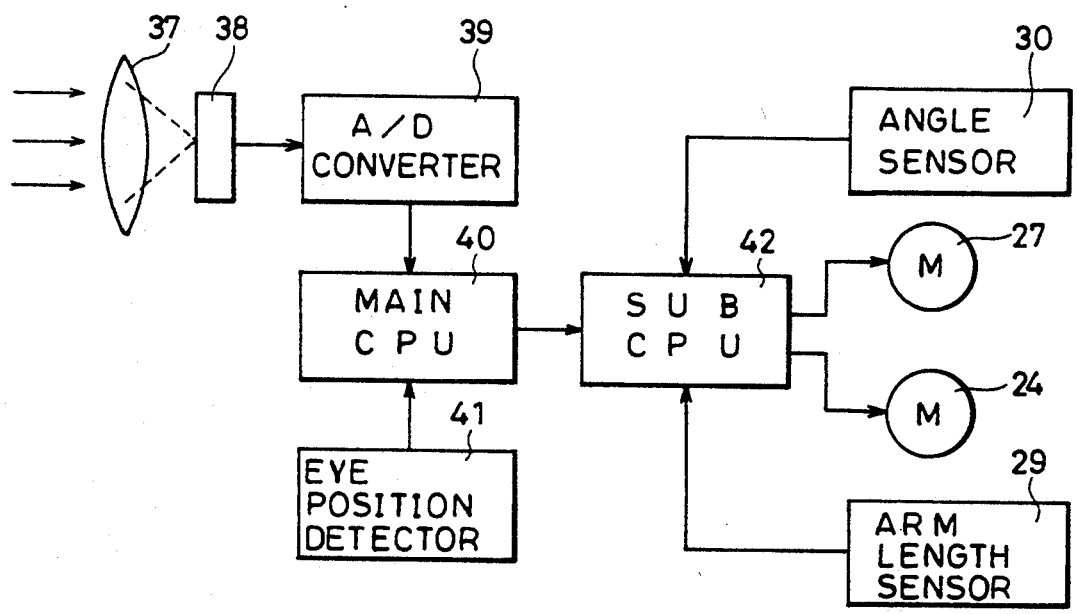
FIG. 13 is a block diagram of a sun visor apparatus according to an eighth embodiment of the present invention.

FIG. 13 is a block diagram of a sun visor apparatus according to an eighth embodiment of the present invention. The mechanical structure of the sun visor apparatus of the eighth embodiment is similar to that of the seventh embodiment shown in FIGS. 10 and 11, provided that motors 24 and 27 are operated automatically, and not by hand. The components in the eighth embodiment corresponding to those in the seventh embodiment of the FIGS. 10-12 have same reference characters denoted. The functions thereof are also identical.

In the sun visor apparatus of the first-seventh embodiments, the section blocking the sunlight is moved manually, or electrically by operating the operation switch by hand. If the vehicle changes its direction, the incident angle of sunlight will also change. It will be necessary to adjust the position of the light-shielding section every time the direction of the vehicle changes. If some operation is to be carried out either manually or electrically by hand, safety driving will be degraded. The sun visor apparatus of the eighth embodiment serves to eliminate such danger.

Referring to FIG. 13, the sun visor apparatus includes a lens 37 for converging the entering sun ray to form an image of the sun on a predetermined image forming plane, a dimensional position sensitive detector 38 (2D-PSD) for providing information to identify the angle of incident light from the position of the image of the sun formed by the lens 37, an A/D converter 39 for converting into a digital signal the analog signal provided from the 2D-PSD 38, an eye position detector 41 for providing information to identify the position of the eye of the driver, a main CPU (Central Processing Unit) 40 for calculating the position of the light shielding plate 9

(refer to FIG. 10) for shielding the eye of the driver from the sunlight with a predetermined program according to the outputs of the A/D converter 39 and the eye position detector 41, and a sub CPU 42 for moving the light-shielding plate 9 to a target position by driving motors 24 and 27 (refer to FIGS. 10 and 11) according to the outputs of the main CPU 40, the arm length sensor 29, and the angle sensor 30.

The lens 37 and 2D-PSD 38 are arranged within the windshield 1 to receive the incident light (refer to FIG. 13). The eye position detector 41 is arranged at a position where the proximity of the driver's head can be detected when the driver is seated.

The sun visor apparatus of the eighth embodiment shown in FIG. 13 operates as follows. The lens 37 converges the incident sunlight to form an image of the sun on a photosensitive plane of 2D-PSD 38. 2D-PSD 38 provides an analog signal representing the position of the lens $(x_s, y_s)$ on the photosensitive plane. The A/D converter 39 converts the analog signal into a digital signal to provide the same to the main CPU 40. The eye position detector 41 detects the position of the eye of the driver to provide a signal representing the position of the eye to the main CPU 40.

The main CPU 40 calculates the target position of the light-shielding plate 9 according to a program including the control flow shown in FIG. 14. In the following description, the characters denoted with an underline (such as $\underline{x}, \underline{\theta}$) represent a vector amount. Referring to FIG. 14, the incident angles $\phi, \theta$ of the sun ray are calculated according to the following equations in step SO1 in the program.

$$\phi = \tan^{-1} \frac{x_s}{f}$$

$$\theta = \tan^{-1} \frac{y_s}{f}$$

where f represents the focal length of the lens 37.

At step SO2, the coordinates $(x_e, y_e, z_e)$ of the position of the eye of the driver is calculated according to the output of the eye position detector 41. An appropriate coordinate system is determined in advance. An image processor, a supersonic measurement, and other optical measurements (for example, a method using laser) may be employed as the eye position detector 41. In the case of a small change in the height or position of the driver, or the position or tilt of the head of the driver, the eye position detector 41 is not required, and a fixed value can be used determined in advance as the eye position.

From the incident angles $\phi, \theta$ of sun ray obtained in step SO1, the incident direction vector $\underline{\theta}$ of the sun ray can be calculated according to the following equation:

$\underline{\theta} = (\cos\phi\cos\theta, \sin\phi\cos\theta, \sin\theta)$

The eye position vector $\underline{x}_e$ is obtained by step SO2:

$\underline{x}_e = (x_e, y_e, z_e)$

From vectors $\underline{\theta}$ and $\underline{x}_e$, the vector $\underline{x}$ representing the line of the sun ray is obtained by the following equation in step SO3:

$\underline{x} = \underline{x}_e + \lambda\underline{\theta}$ where $\lambda$ is an arbitrary real number.

At step SO4, a process is carried out for obtaining the crossing point between the straight line $\underline{x}$ obtained in step SO3 and the traveling plane of the light-shielding plate 9 (refer to FIG. 10). The process of obtaining this crossing point can be carried out as solving normal simultaneous equations.

At step SO5, an instruction is sent to the sub CPU 42 to drive motors 27 and 24 with the crossing point obtained in step SO4 as the target coordinates. As a result, the motors 24 and 27 shown in FIGS. 10 and 11 move the light-shielding plate 9 to the target position. Because the light-shielding plate 9 is positioned between the sun and the eye of the driver, the glare of the sun ray can be intercepted. Safety driving can be realized because the travel of the light-shielding plate 9 is carried out without the involvement of the driver.

When moving the light-shielding plate 9 as described above, the gain of the control system shown in FIG. 13 should be set to a rather low value. It has been found out that a great response of the light-shielding plate 9 with respect to a change in the position of the sun for a detailed operation of light-shielding will result in the vibration of the light-shielding plate to annoy the driver.

In the above-described eighth embodiment, it is desirable that the crossing point between the plane formed by a region in which the light-shielding plate 9 can travel and the sun ray is determined in a one to one correspondence. By providing a program of the main CPU 40 which can directly instruct the sub CPU 42 of the moving amount of the light-shielding plate 9 according to the coordinates of the crossing position, the time required for calculation can be reduced.

In the above-described embodiments, the light-shielding plate 9, the sub-polarizing plate 3 and the main polarizing plate 2 are moved mechanically. The present invention is not limited to such a mechanical movement and the light-shielding area can be electrically formed at an arbitrary position on the windshield by using a large liquid crystal plate attached to the windshield 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A glare-reduction apparatus for a vehicle having a windshield, comprising:
   a light-shielding plate;
   a swingable extensible arm swingably supported to the vehicle and having a distal end to which said light-shielding plate is attached;
   an arm extending mechanism for extending and retracting said arm to adjust a length thereof;
   a swinging mechanism for swinging said arm with respect to said windshield;
   means for controllably driving said arm extending mechanism and said swinging mechanism; and
   glare sensing means for detecting a glare directed at the eyes of an occupant of the vehicle and for generating a corresponding control signal to control said driving means to position said light-shielding plate so as to reduce said glare.

2. A glare-reduction apparatus for a vehicle having a windshield, comprising:
   light-shielding means for intercepting glare at a selected position of said windshield;
   moving means for selectively moving said light-shielding means in two-dimensions and adjacent to an inside surface of the windshield, wherein said moving means comprises an arm formed from a rolled up length of material selectively extensible by reeling from and onto a reel driven by a motor, said arm having a distal end to which the light-shielding means is supported.

3. The glare-reduction apparatus as claimed in claim 2, further comprising:
roller means, mounted to said distal end of said arm where the light-shielding means is supported, for providing a rolling contact between said distal end of said arm and an inside surface of said windshield.

4. The glare-reduction apparatus as claimed in claim 2, wherein:
said light shielding means is supported rotatably with respect to said arm, and is weighted so as to depend in a horizontal disposition below said distal end of said arm.

5. The glare-reduction apparatus as claimed in claim 3, wherein:
said light shielding means is supported rotatably with respect to said arm, and is weighted so as to depend in a horizontal disposition below said distal end of said arm.

6. The glare-reduction apparatus as claimed in claim 2, wherein:
said reel is mounted to said vehicle above said windshield and is rotatable with respect to said windshield to enable said distal end of said selectively extended arm to be adjustable positioned over a selected portion of said windshield.

7. The glare-reduction apparatus as claimed in claim 6, further comprising:
means for controlling said rotation of said reel with respect to said windshield and said length of said arm extended from said reel.

8. The glare-reduction apparatus as claimed in claim 5, wherein:
said reel is mounted to said vehicle above said windshield and is rotatable with respect to said windshield to enable said distal end of said selectively extended arm to be adjustable positioned over a selected portion of said windshield.

9. The glare-reduction apparatus as claimed in claim 8, further comprising:
means for controlling said rotation of said reel with respect to said windshield and said length of said arm extended from said reel.

10. The glare-reduction apparatus as claimed in claim 1, wherein:
said light-shielding plate is rotatably attached to said arm and is weighted to be disposed horizontally therefrom.

11. The glare-reduction apparatus as claimed in claim 10, further comprising:
roller means, mounted to said arm where said light-plate is attached to said arm, for providing rolling contact between said arm and an inside surface of said windshield.

12. The glare-reduction apparatus as claimed in claim 2, wherein:
said rolled up length of material forming said extensible arm comprises steel and has a bow-shaped cross section.

* * * * *